UNITED STATES PATENT OFFICE.

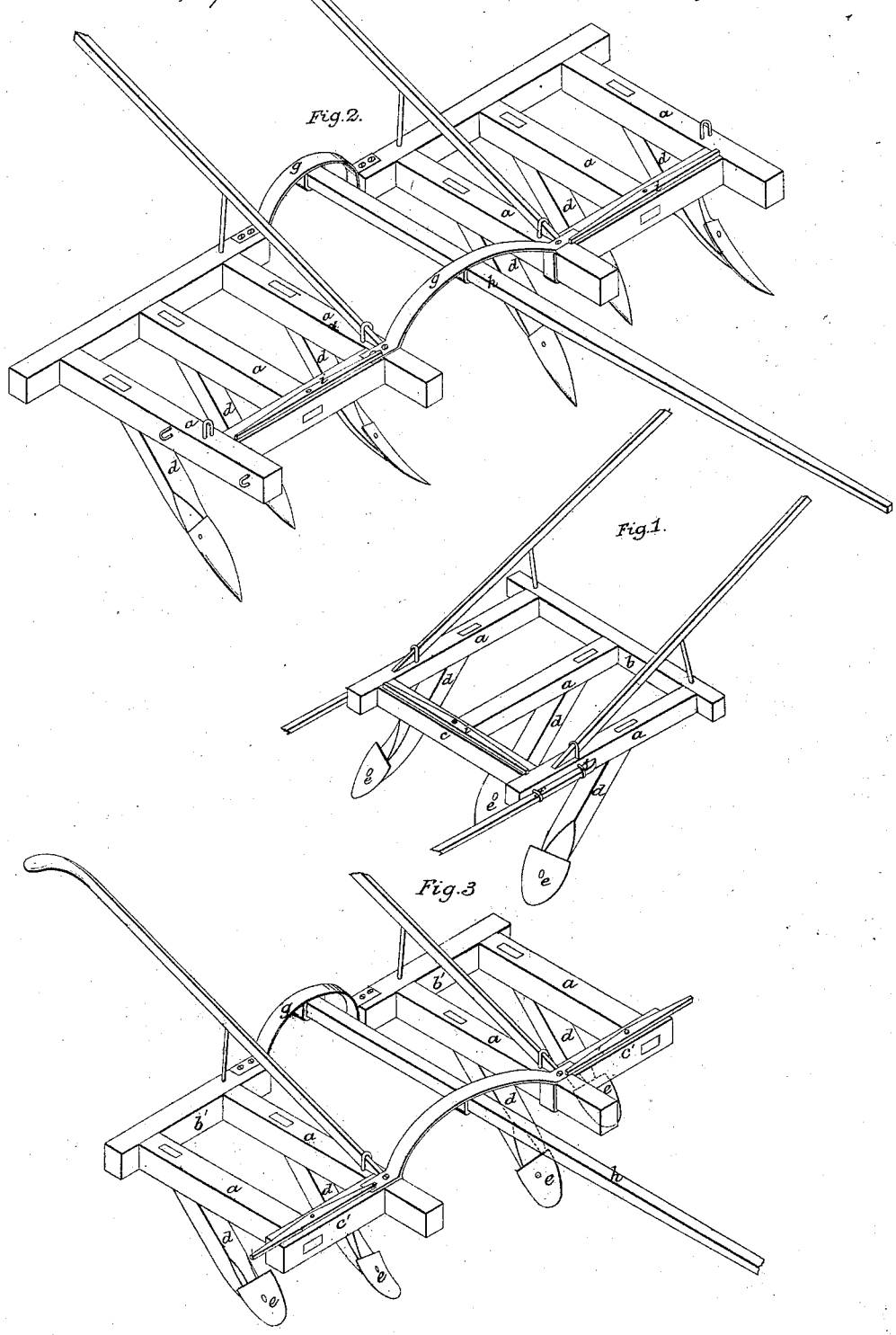

WILLIAM DYZERT, OF GETTYSBURG, PENNSYLVANIA.

IMPROVEMENT IN CULTIVATORS.

Specification forming part of Letters Patent No. 3,709, dated August 16, 1844.

*To all whom it may concern:*

Be it known that I, WILLIAM DYZERT, of Gettysburg, in the county of Adams and State of Pennsylvania, have invented a new and useful improvement in seeding and cultivating corn, &c., which I denominate the "Universal Cultivator;" and I do hereby declare that the following is a full, clear, and exact description thereof, reference being had to the accompanying drawings, which form a part of this specification, in which—

Figure 1 represents a one-horse three-shovel cultivator. It is constructed as follows:

A square frame is made, consisting of three longitudinal pieces, $a$, each having a tenon at one end that enter the mortises in a cross-piece, $b$, which tenons are placed at equal distances apart. The two outside pieces have mortises through their sides, near the front end, opposite the tenon above named, into which a front cross-piece, $c$, is tenoned, said cross-piece having a mortise at its center for receiving a tenon on the center longitudinal piece $a$. This forms a stout compact frame, and from its under side are three posts or standards, projecting in an inclination forward, one from each longitudinal beam $a$. To these the shovels $e$ are attached, the two outer ones slanting, so as to turn the furrows outward, and the center one straight. Staples are driven into the outer sides of the beam $a$ at $ff$, into which shafts are put, and on the tops of the outer beams are similar staples for receiving the handles of the cultivator.

When ground is to be forked I attach forks to the standards $d$ in place of the shovels, as shown in Fig. 2. In this machine two frames like the one described are placed side by side at a sufficient distance apart, and are connected by two or three braces of iron, $g$, to which a stiff tongue, $h$, is attached. To this machine two horses are hitched, by which it is drawn through the ground, steadily and effectually performing the work for which it is intended. For the last plowing of corn shovels, as first described, may be substituted for the forks. These will finish one row in the center and half finish two rows on each side. All these changes are made with two of the single-horse frames first described.

Fig. 3 represents a double two-horse plow with four shovels—that is, with the two outside shovels left off. This is effected simply by having two additional cross-pieces to substitute for those marked $b$ and $c$, which are designated $b'$ and $c'$. In Fig. 3 they are made like the other cross pieces, but only have mortises for two beams $a$. This portion of the machine completes one row of corn at a time, and is used with two horses where the ground is somewhat stiff, instead of that last before named. The iron braces $g$, which connect the two sides of the frames of the two last-named machines, are curved upward high enough to clear the top of the corn and carry the tongue above it, the traces being hitched to a whiffletree, $i$, attached to each frame. The handles of the two-horse machine are carried to one side, as shown in the drawings, for the purpose of allowing the man who holds it to walk on one side the row.

With this universal cultivator the whole operation of working the corn in any ground can be accomplished.

In planting I employ a gage consisting of a frame of four pieces, from which two standards project downward, armed with iron, to gage for dropping the corn a certain distance apart, equal to what is required by the cultivator, the two being adjusted to each other, of common construction.

What I claim as my invention, and desire to secure by Letters Patent, is—

The curved iron braces which connect the two sides together, in combination with said sides and the tongue, constructed for the purpose and arranged in the manner above specified.

WILLIAM DYZERT.

Witnesses:
J. J. GREENOUGH,
F. C. DONN.